(12) United States Patent
Specht

(10) Patent No.: US 7,237,741 B2
(45) Date of Patent: Jul. 3, 2007

(54) ROTARY DRIVE FOR A WINDING SHAFT OF A SEAT BELT RETRACTOR

(75) Inventor: Martin Specht, Feldafing (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 243 days.

(21) Appl. No.: 10/833,957

(22) Filed: Apr. 29, 2004

(65) Prior Publication Data

US 2004/0245361 A1 Dec. 9, 2004

(30) Foreign Application Priority Data

Jun. 5, 2003 (DE) .................. 103 25 583

(51) Int. Cl.
*B60R 22/46* (2006.01)
(52) U.S. Cl. ..................................... 242/374
(58) Field of Classification Search ............... 242/374, 242/390.5; 280/806, 807; 297/475, 476, 297/477, 478; 60/632, 905
See application file for complete search history.

(56) References Cited

U.S. PATENT DOCUMENTS

| 4,444,010 A | 4/1984 | Bendler |
| 5,782,423 A * | 7/1998 | Miller et al. ................. 242/374 |
| 5,881,962 A | 3/1999 | Schmidt et al. |
| 6,149,095 A | 11/2000 | Specht et al. |
| 6,345,504 B1 * | 2/2002 | Takehara et al. ............... 60/638 |
| 6,532,739 B2 * | 3/2003 | Kameyoshi et al. .......... 60/638 |
| 6,612,514 B1 * | 9/2003 | Schmidt ..................... 242/374 |

FOREIGN PATENT DOCUMENTS

| DE | 2 931 164 A1 | 2/1981 |
| DE | 3 220 498 A1 | 12/1983 |
| DE | 198 46 227 A1 | 4/2000 |
| EP | 0 629 531 B1 | 4/1997 |
| GB | 2 325 896 A1 | 12/1998 |
| WO | WO 01/00460 A1 * | 1/2001 |

* cited by examiner

*Primary Examiner*—John Q. Nguyen
*Assistant Examiner*—Scott Haugland
(74) *Attorney, Agent, or Firm*—Lonnie Drayer

(57) ABSTRACT

A rotary drive device for a winding shaft of a seat belt retractor has preformed drive bodies arranged one behind the other, which are guided and can be driven in a guide path. Each drive body has engagement parts that can be brought into engagement in an essentially interlocking manner with engagement points located at the periphery of the drive wheel.

9 Claims, 9 Drawing Sheets

ROTARY DRIVE FOR A WINDING SHAFT OF A SEAT BELT RETRACTOR

FIELD OF THE INVENTION

The invention relates to a rotary drive device for a winding shaft of a seat belt retractor for a vehicle seat belt.

DISCUSSION OF THE PRIOR ART

U.S. Pat. No. 4,444,010 teaches drive bodies that are arranged one behind the other in a guide means and can be driven along the guide means by a thrust drive. The transmission of the kinetic energy resulting from the drive movement of the drive bodies onto a drive wheel, which is in rotary drive connection with a winding shaft of a seat belt retractor and which rotates around a wheel axis, takes place through frictional contact or in part through an interlocking connection as a result of the ability of the material of the drive bodies to undergo deformation. In this case it is unavoidable that a significant part of the drive energy is lost.

U.S. Pat. No. 5,881,962 teaches a pyrotechnic rotational tightening drive comprising ball-shaped drive bodies, whereby in the region where the drive bodies and the drive wheel come into contact there is flexibility or elasticity, in particular in the wall section of the guide path. U.S. Pat. No. 5,881,962 also teaches a rotational tightening drive comprising, if applicable, pyrotechnically accelerated drive bodies in the shape of balls, which engage dome-shaped recesses situated at the periphery of the drive wheel and are adapted to the shape of the ball-shaped drive bodies. During the engagement of the drive wheel, the drive bodies, which engage over the dome-shaped recesses, remain in permanent point contact.

EP 0 629 531 B1 teaches driving a drive wheel as a gear wheel by a toothed rack, which is driven by a thrust force. For the linear drive movement of the toothed rack there is a certain space requirement.

SUMMARY OF THE INVENTION

According to the present invention, each drive body comprises at least one engagement part, which during the drive movement engages one of several engagement points located at the periphery of the drive wheel and adapted to the shapes of the engagement parts. During the engagement of the engagement parts with the drive wheel, the engagement parts are held at distances from one another by spacers at distances which correspond to the distances between the engagement points on the drive wheel.

The engagement part on the drive body preferably engages the engagement point on the drive wheel in an interlocking manner. With reference to the transmission of the kinetic energy, the same efficiency is achieved as with a toothed rack drive (EP 0 629 531 B1).

The drive wheel is preferably a toothed drive wheel, between the teeth of which the engagement points are located. The engagement parts on the drive bodies are preferably projections or teeth. The engagement parts can, however, also be round or curved, in particular cylindrical surfaces. The drive bodies can be spool shaped flanged reels. The cylindrical surfaces of said reels forming the engagement parts, which engage engagement points, preferably troughs in the drive wheel.

DETAILED DESCRIPTION OF THE INVENTION

Figure 1:
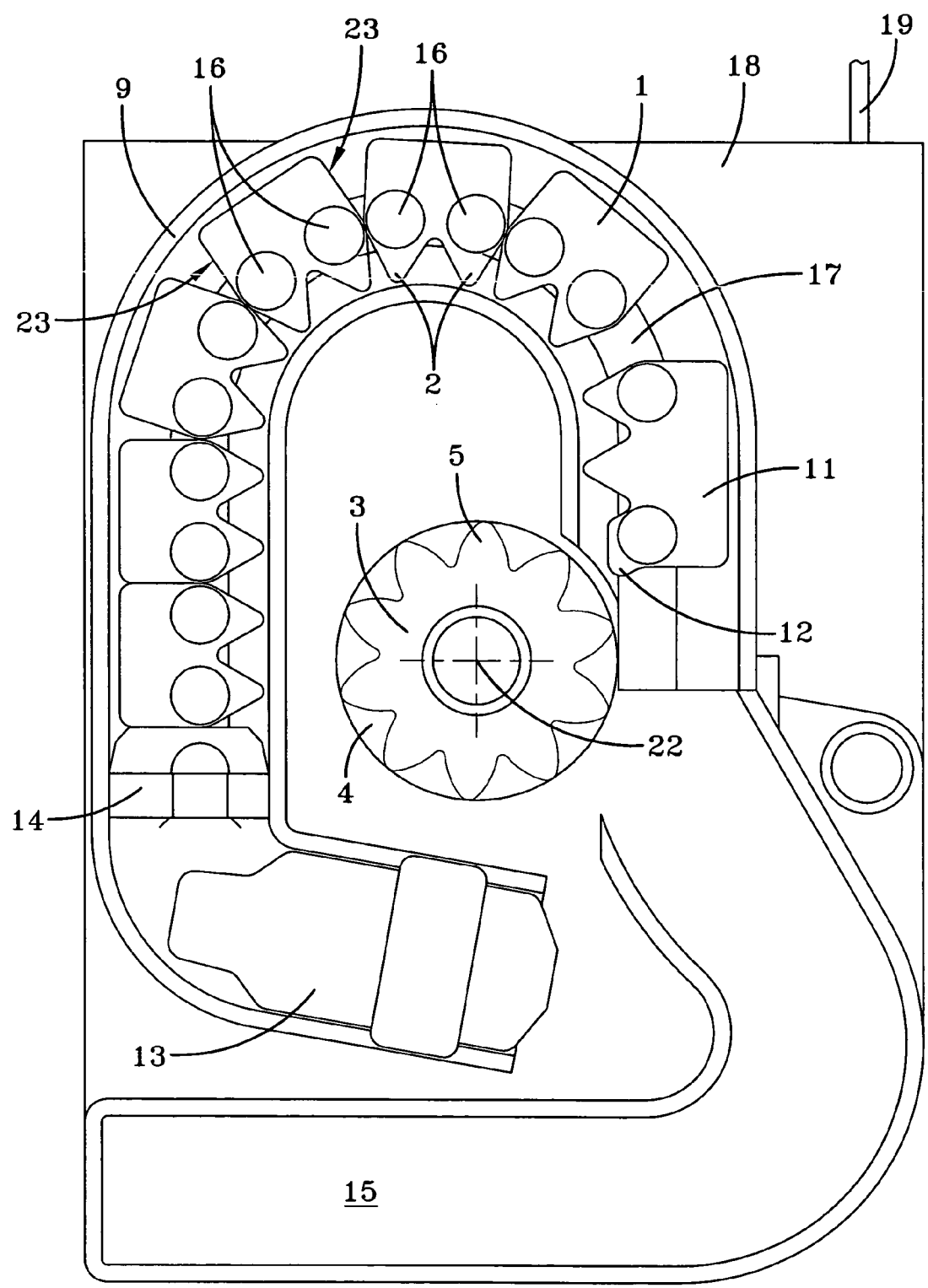
FIG. 1 is a side view of a first embodiment in a starting position.

In the embodiments shown, preformed drive bodies 1 arranged one behind the other are guided in a guide path 10 of a guide device 9. The device is preferably used for power tightening of the vehicle seat belt wound on the winding shaft in the event of a crash. The drive force is preferably used as a thrust force at the end of the arrangement one behind the other of the drive bodies. The thrust force can for instance be supplied by a pyrotechnic drive.

To achieve a space-saving arrangement, the guide path 10, in which the drive bodies are moved during the drive movement, can display at least one bend. Due to this bend, two parallel straight-lined guide path sections can be connected to one another. The guide path 10 comprises a curved path having a bend portion and two parallel straight path sections. The drive wheel 3 is located in the region of one of the two straight-lined path sections, A drive wheel 3 is connected to a winding shaft of a seat belt retractor 18 for a vehicle seat belt 19, either directly or by a gear (not shown). The drive wheel 3 is rotatably mounted around an axis of rotation 22 of a winding shaft of a seat belt retractor.

The drive bodies 1, which are arranged one behind the other in the guide path 10, can be designed differently.

Figure 2:
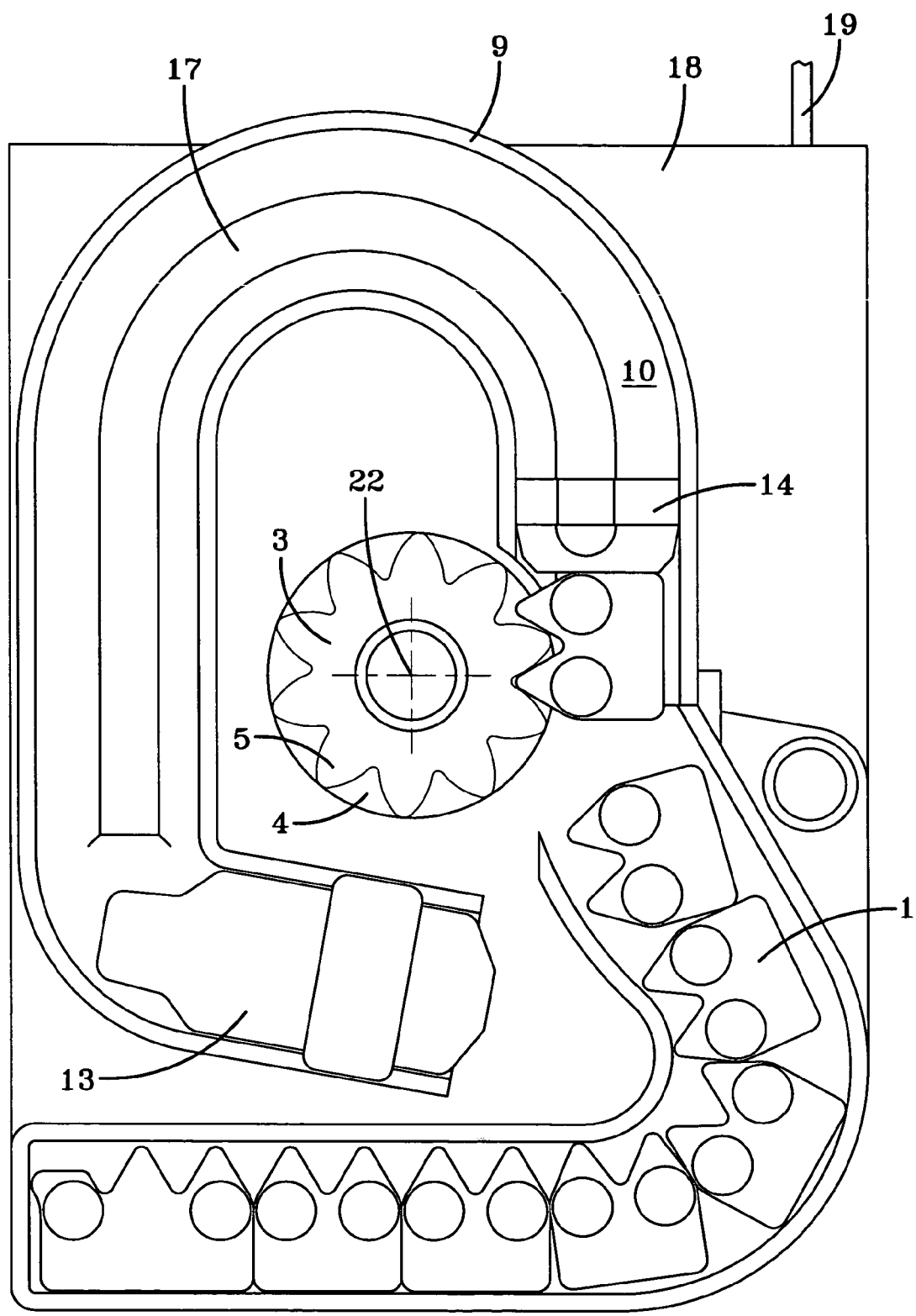
FIG. 2 is a side view of the embodiment of FIG. 1 in an end phase of the tightening operation.
Figure 4:
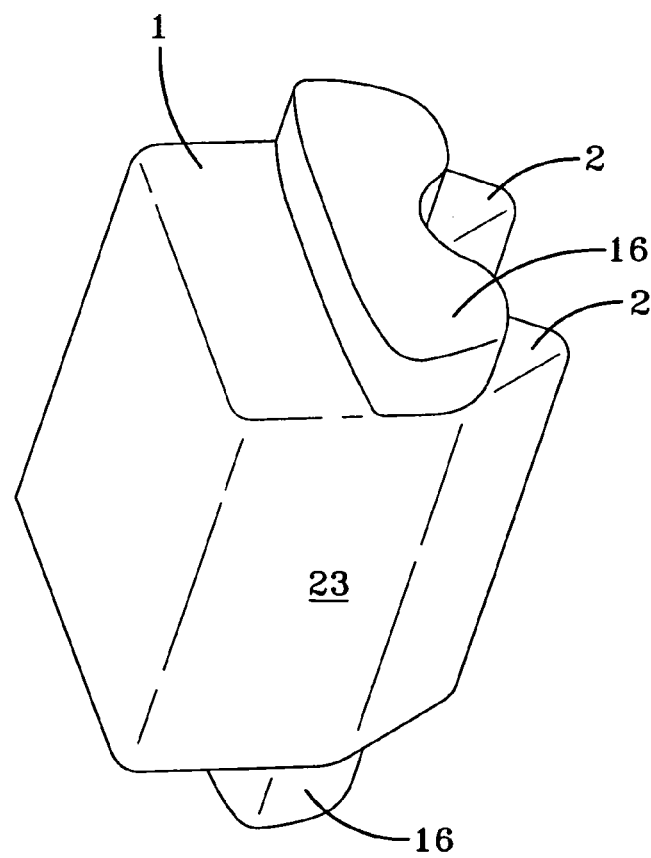
FIG. 4 is a perspective view of a drive body, which can be used in FIG. 1.

In the embodiment shown in FIG. 4, each drive body 1 comprises two projections in the shape of teeth, which act as engagement parts. The drive bodies 1 are toothed rack segments. During the driving of the drive bodies 1 the teeth-like engagement parts 2 engage complementary shaped engagement points 4, which are located between teeth 5 on the periphery of the drive wheel 3, as shown in FIG. 2. In this case a tooth engagement of the drive bodies 1 arranged one behind the other in the straight region of the guide path is achieved as in the case of a toothed rack, known for instance from EP 0 629 531 B1. The distance between the tooth-shaped engagement parts 2 corresponds to the distance between engagement points 4 created between the teeth 5 on the periphery of the drive wheel 3. The engagement points 4, in particular the limiting flanks of the engagement points 4 are complementary in their shape to the flank shape of the tooth-shaped engagement parts 2, so that an interlocking engagement is achieved.

The engagement parts preferably display steady or constant cross sections along their extension that extends parallel to the wheel axis. In the same manner the engagement points are provided with steady or constant cross sections at the periphery of the drive wheel in their extension parallel to the wheel axis.

Figure 3:
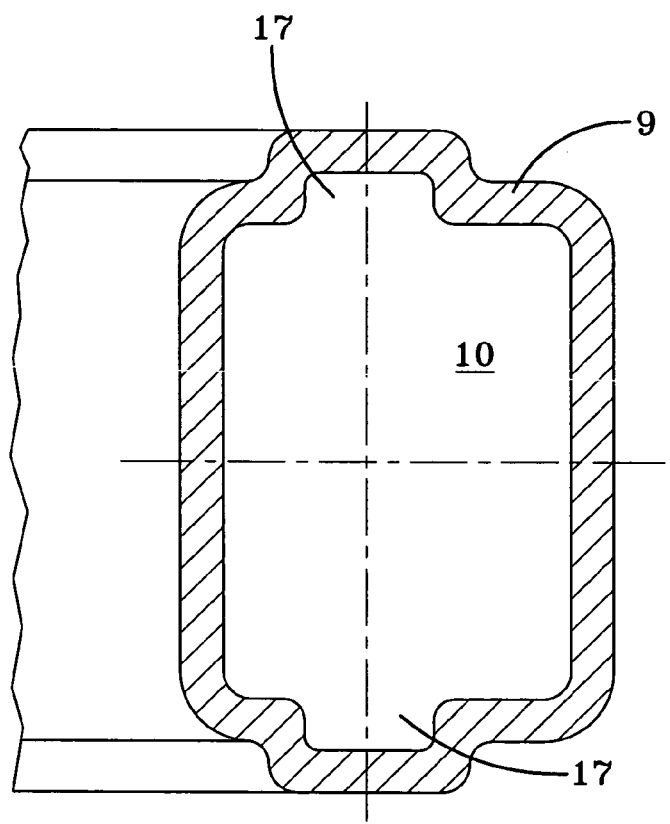
FIG. 3 is a cross section through the guide path of the drive bodies of the embodiment shown in FIGS. 1 and 2.

The drive bodies 1 are guided in the guide path 10 during their drive movement in an interlocking manner. The drive bodies can be provided with projections 16 as guide elements, which are preferably positioned on opposite sides of the drive body. The projections 16 engage complementary recesses 17 (FIG. 3) of the guide path 10 in an interlocking manner. The cross sectional shape of the drive body 1 lying transverse to the drive movement can be adapted to the inner contour of the guide path 10, along which the drive bodies are guided during the drive. In this manner support of the drive bodies, in particular those lying in the straight portion of the guide path, and which are successively brought into engagement with the drive wheel 3, is achieved. Put another way, the cross-sectional shape of the drive bodies lying transversely to the drive movement can be adapted to the cross section of the guide path, in which the drive bodies are guided.

In an advantageous manner, reaction forces, which act upon the drive bodies during the engagement of the drive bodies in the drive gear wheel, are absorbed by the guide device, which is secured to the vehicle structure by the seat belt retractor frame or in another suitable manner. Reaction forces, which arise during the engagement of the drive bodies 1 with the drive wheel 3, are absorbed without tipping or tilting of the drive bodies by the guide device 9. The wall of the guide device 9 consists of a stable and non-yielding material in the region of the engagement of the drive bodies 1 with the drive wheel 3. The drive bodies 1 lined up next to one another thus create a "segmented toothed rack". This "toothed rack" is however created in such 3 manner that it can also be moved in a space-saving manner in the curved part of the guide path 10. Due to the fact that preferably two tooth-shaped engagement parts 2 are foreseen on each drive body 1, the unhindered guiding of the drive bodies 1 is also ensured in the curved part of the guide path 10 (FIG. 1).

The tooth-shaped engagement parts 2 are held at a predetermined distance from one another in successive drive bodies 1. This distance corresponds to the distance between the engagement points 4 on the periphery on the drive wheel 3. The drive bodies are made of solid non-yielding material, so that during the engagement of the engagement parts 2 with the drive wheel 3 the distances between the successive engagement parts 2 are maintained precisely.

In the embodiment of FIGS. 1 to 4, the tooth-shaped engagement parts 2 display steady or constant cross sections in their extension perpendicular to the drive direction or parallel to the axis of rotation 22 of the winding shaft of the seat belt retractor. In addition, at the periphery of the drive wheel 3 the engagement points 4 display equally steady cross sections in their extension parallel to the axis of rotation 22 of the winding shaft of the seat belt retractor. The tooth flanks of the engagement parts 2 and the teeth 5, between which the engagement points 4 are created, are preferably designed in such a manner that a slip-free and effective transfer of the kinetic energy takes place onto the drive wheel 3, as in a toothed rack-spur wheel gear device.

The drive bodies 1 lie against one another on contact surfaces 23, which extend parallel to the axis of rotation 22 of the winding shaft of the seat belt retractor. In this manner, a reliable support of the drive bodies over the entire width of the guide path is reliably ensured.

Figure 5:
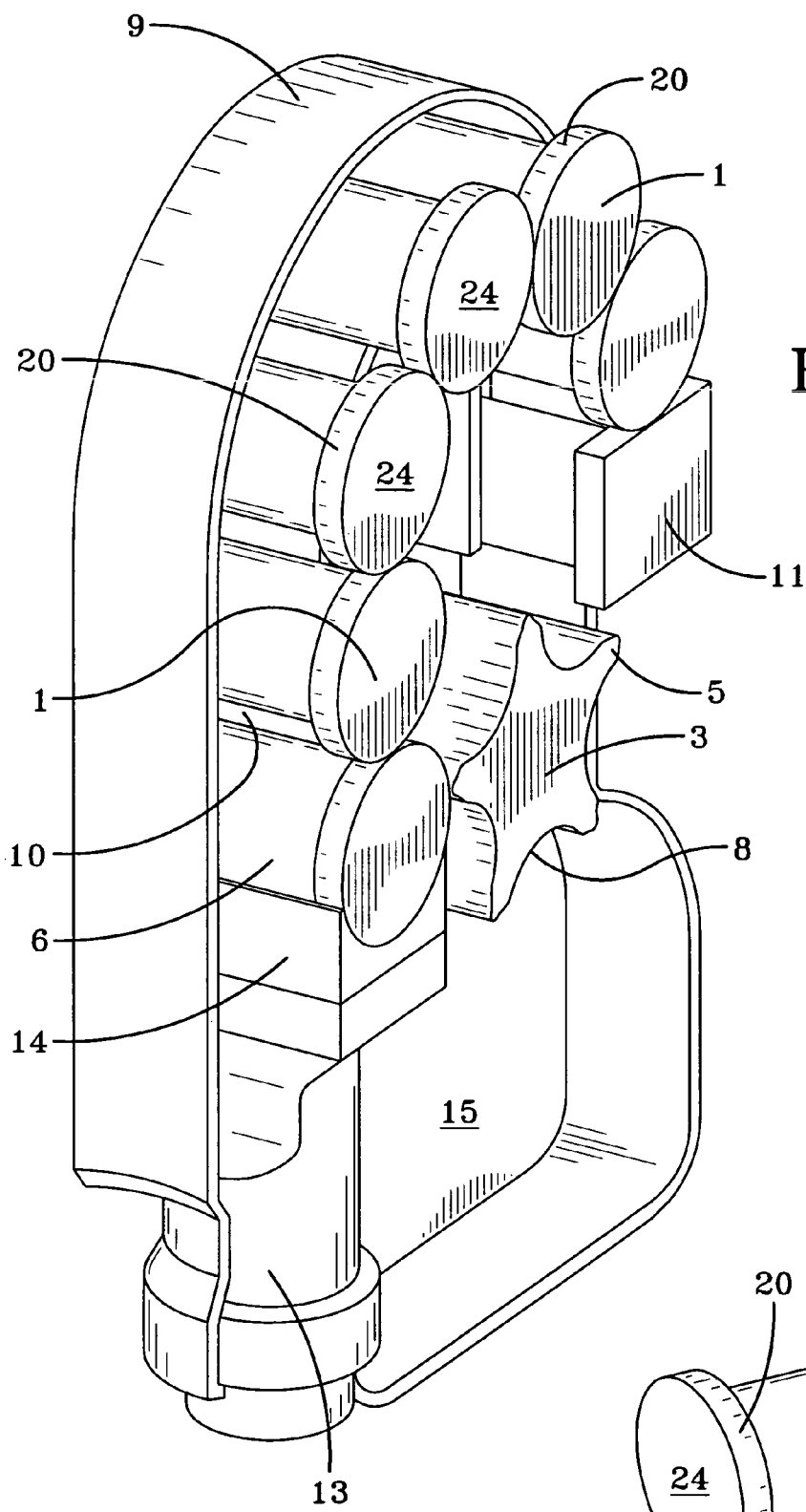
FIG. 5 is a perspective, partly exploded view of a second embodiment of the invention.
Figure 6:
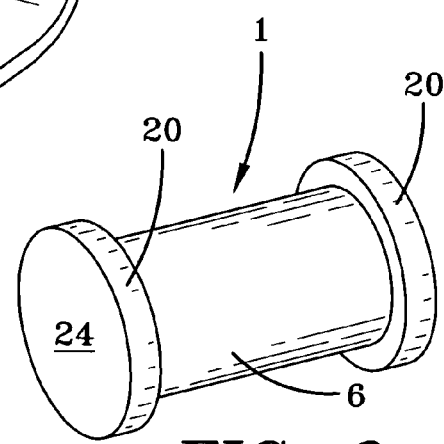
FIG. 6 shows a drive body used in the second embodiment.

In FIG. 5 a further embodiment is shown, in which the drive bodies 1 are provided with curved, in particular spool shaped flanged engagement parts 6, as shown in FIG. 6. FIG. 6 shows a drive body, which is used in the embodiment in FIG. 5. Between the teeth 5 of the drive wheel 3, complementary trough-shaped engagement points 8 are created, in which the cylindrical surfaces of the engagement parts 6 engage in an interlocking manner. At the ends of each spool shaped engagement part 6, flanges 20 are located, which act as circular spacers 20. In the region of these flanges 20, the drive bodies 1 lie against one another in their arrangement one behind the other, as shown in FIG. 4. By means of the diameters of the flanges 20, the distances between the cylindrical surfaces of the engagement parts 6 are determined, so that these distances correspond to the distances of the trough-shaped engagement points 8 on the drive wheel 3. As in the embodiment of FIG. 1, the drive bodies 1 of the embodiment of FIG. 5 are also guided in a curved guide path 10 of the guide device 9. The engagement of the drive bodies 1 with the drive wheel 3 takes place also in the region of a straight-section of the guide path 10.

The drive bodies can be connected to each other in a hinge-mounted manner, in particular a swivel-mounted manner around the swiveling axes of the coupling points. The drive bodies arranged one behind the other thus form a chain. It is also possible, however, to line the drive bodies loosely next to one another on contact surfaces, which are adapted to each other in shape, in the guide path of the guide device.

Figure 7:
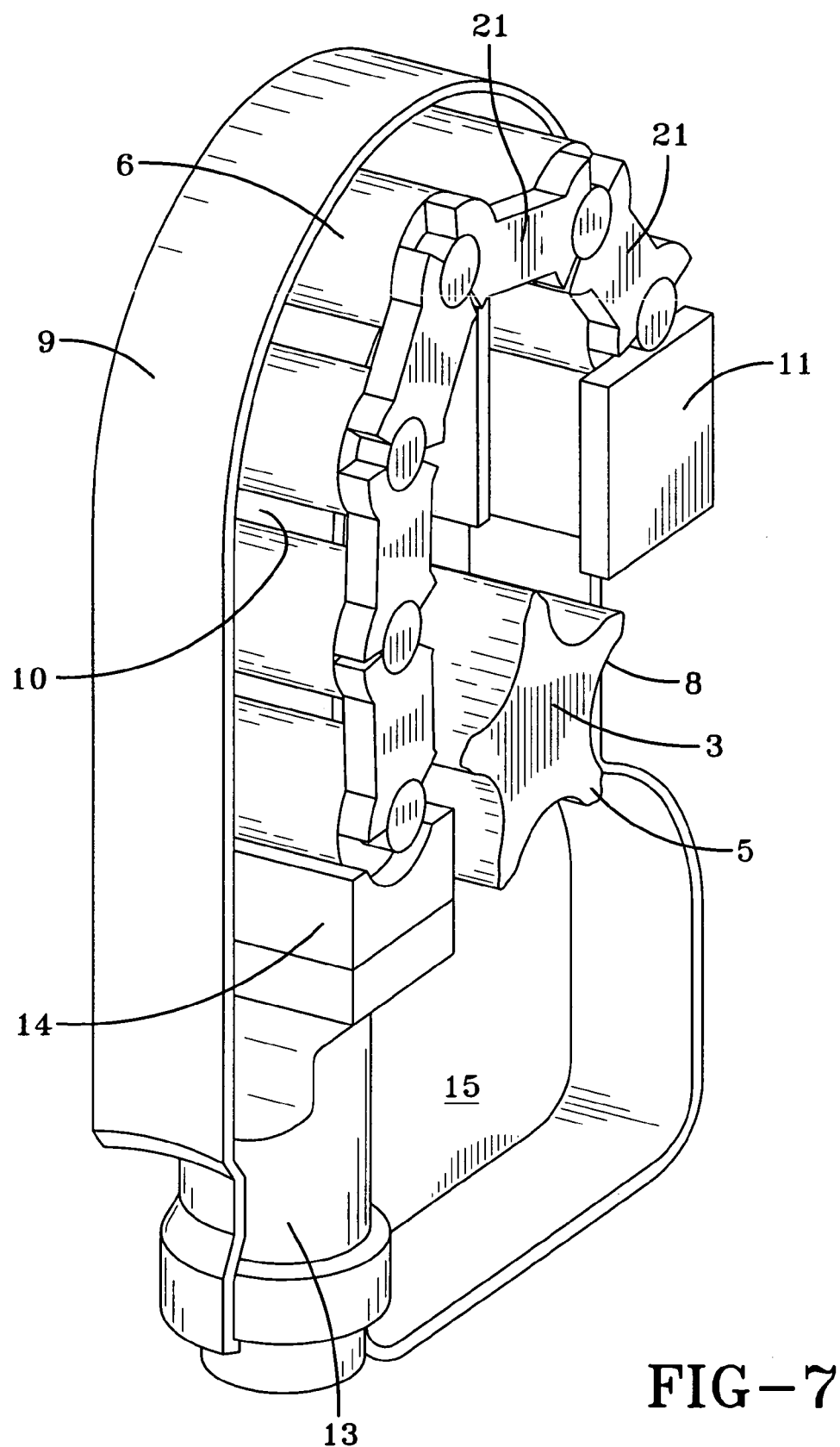
FIG. 7 is a perspective, partly exploded view of a third embodiment of the invention.
Figure 8:
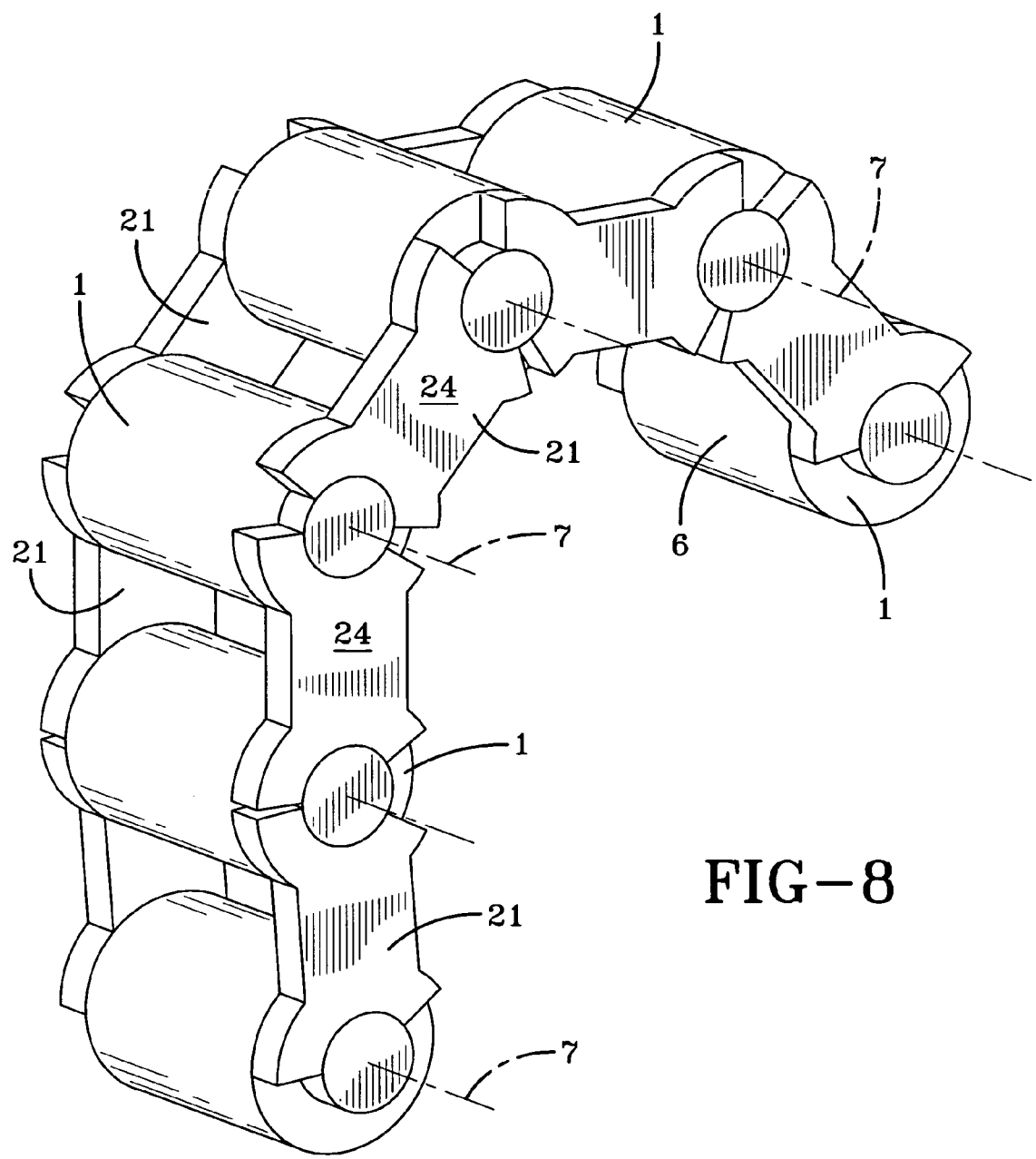
FIG. 8 shows several drive bodies that are connected to each other in a chain in a hinge-mounted manner, used in the embodiment of FIG. 6.

In the embodiment shown in FIGS. 7 and 8, the drive bodies 1, which also comprise spool shaped flanged engagement parts 6, are connected together by a chain by spacers 21 that are connection elements. The engagement parts 6 with the cylindrical shaped surfaces are held at a distance from one another by the connection elements or spacers 21. The distances correspond to the spacing of the trough-shaped engagement points at the periphery of the drive wheel 3. The connection elements 21 engage flanges of the drive bodies 1 in such a manner that the drive bodies 1 can be swiveled around swiveling axes 7 opposite the connection elements 21. In this manner the drive bodies 1 are connected with each other and the connection elements 21 as chain members in a chain in a hinge-mounted manner.

In the embodiment of FIGS. 5 and 6, guide surfaces 24 are foreseen on the front sides of the spool-shaped drive bodies 1, guide surfaces which are uniformly designed and which are moved along equally uniformly designed guide surfaces of the guide path 9. Uniformly designed guide surfaces 24 are also foreseen in the embodiment of FIGS. 7 and 8 on the front sides of the drive bodies 1 and the spacers 21. These guide surfaces 24 are also guided along uniform guide surfaces of the guide path 10 (FIG. 7).

To ensure a perfect engagement of the drive bodies with the drive gear wheel during the drive of the winding shaft, a mechanical synchronization device can be provided at the beginning of the arrangement one behind the other of the drive bodies, moving a limiting surface of one of the engagement points into the movement path of the engagement part foreseen directly on the subsequent drive body. The synchronization device can comprise a catch or an entrainer, which moves the limiting surface of the engagement point into the guide path to the extent that during the drive movement the contact part on the first drive body is moved into the engagement point of the drive wheel.

Figure 9:
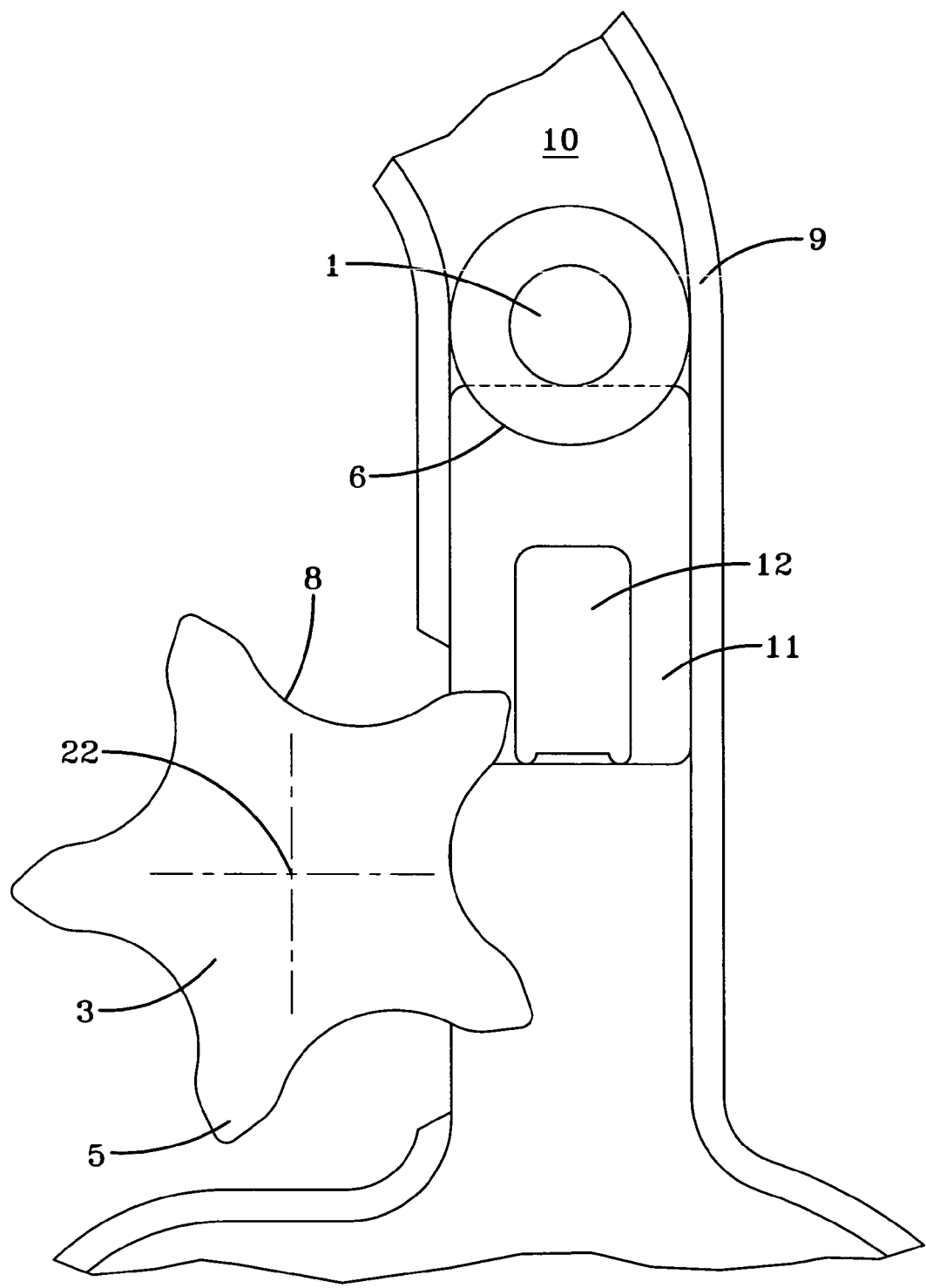
FIG. 9 shows a mechanical synchronization device at the beginning of the arrangement one behind the other of the drive bodies in a starting position.
Figure 10:
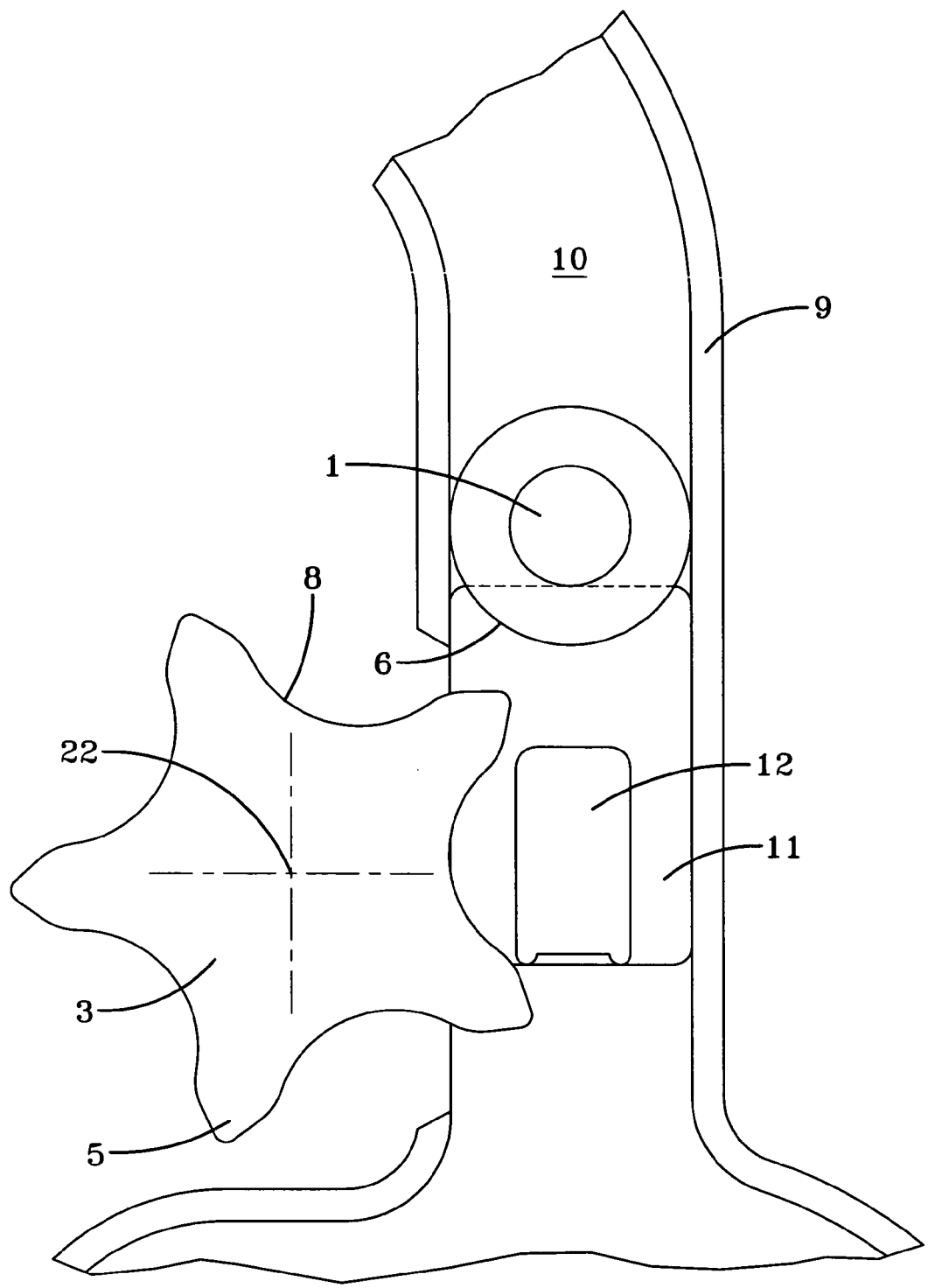
FIG. 10 shows the synchronization device of FIG. 9 in a first operating position.
Figure 11:
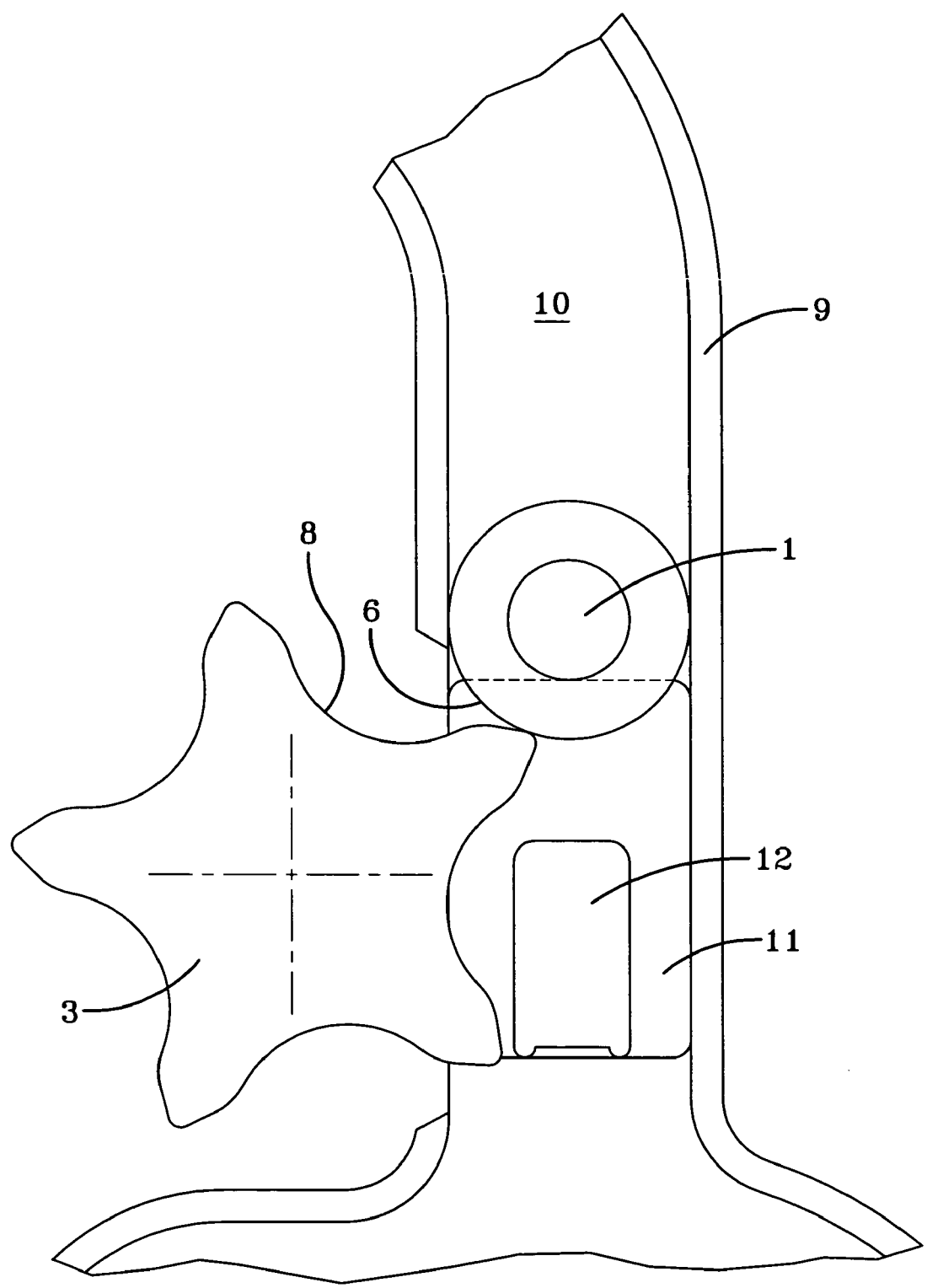
FIG. 11 shows the synchronization device in a second operating position.

At the beginning of the arrangement one behind the other of the drive bodies 1 the embodiments comprise a mechanical synchronization device 11. As can be seen in FIGS. 9 to 11, the synchronization device 11 ensures that the first drive body 1 enters into a synchronous engagement with one of the engagement points 8 on the drive wheel. In the embodiment of FIGS. 1 and 2, the synchronous engagement is achieved by the synchronization device 11. The mechanical synchronization device 11 comprises a catch 12, which during normal driving conditions is in its starting position in FIG. 9. When the arrangement one behind the other of the drive bodies, for instance for tightening the seat belt 19, is driven in the guide path 10, the catch 12 moves in the guide path and comes into contact with one of the teeth of the drive wheel 3 (FIG. 10), so that the drive wheel 3 is rotated in such a manner that a flank of one of the subsequent teeth 5, which limit the engagement points 8, is moved into the movement path of the engagement part 2, 6 of the first drive body. In this manner the synchronous engagement is ensured not only with the first drive body, as shown in FIG. 11, but based on the above mentioned distances between the engagement parts 2, 6, the synchronous engagement is also ensured with the subsequent drive bodies.

After their engagement with the drive wheel 3, the drive bodies arrive at a reception chamber 15.

For the drive of the drive bodies 1, a thrust drive 13 is required, which can be a pyrotechnic gas generator. The thrust drive 13 drives a thrust piston 14 at the end of the arrangement one behind the other of the drive bodies 1. The thrust piston propels the drive bodies through the guide path 10 for the drive movement. The thrust drive 13 can also be integrated in the thrust piston 14.

At the end of the drive movement (e.g. FIG. 2), subsequent drive bodies 1 which are still in engagement with the drive wheel 3 can be moved back in the guide path 10 opposite to the drive direction. This can for instance be required if in the event of a crash the vehicle occupant wearing a seat belt 19 is held back with the belt force limitation. It is required that the seat belt webbing tightened during the drive is released again in the opposite direction with a predetermined restraint force in the belt extraction direction. The drive wheel 3 then rotates in the opposite direction to the drive direction. A vent valve is preferably located in the piston 14 and/or in the thrust drive 13, through which this reverse movement of the drive bodies in the guide path 10 is rendered possible.

The synchronization device 11 and the first drive body or some of the first drive bodies are preferably made of more resistant material than the subsequent drive bodies. In this manner, it is taken into consideration that at the beginning of the drive movement a higher force is to be transferred to the drive wheel 3 than in the later course of the drive.

The engagement parts advantageously display distances from each other on the drive bodies arranged one behind the other, distances which correspond to the distances of the engagement points on the drive wheel. In this manner during the drive of the winding shaft the engagement parts engage the engagement points on the drive wheel without any significant energy loss.

Many changes and modifications in the above-described embodiment of the invention can, of course, be carried out without departing from the scope thereof. Accordingly, that scope is intended to be limited only by the scope of the appended claims.

I claim:

1. A rotary drive device for a winding shaft of a seat belt retractor comprising drive bodies that are arranged one behind the other in a guide path and which can be driven by a thrust drive along the guide path, and comprising a drive wheel that is connected with a winding shaft of the seat belt retractor that is rotatable around an axis of rotation of the winding shaft of the seat belt retractor, and which the drive bodies engage during a drive movement, whereby each drive body comprises at least one engagement part, which during the drive movement engages one of several engagement points that are located at the periphery of the drive wheel and are complementary in shape to the engagement part, the engagement parts having an extension of constant cross section parallel to the axis of the winding shaft and perpendicular to the drive direction engaging the engagement points of the drive wheel and are held at a distance from one another by spacing means, and wherein the guide path comprises at least one bend and the drive wheel lies on a portion of the guide path on which the drive bodies are guided in a straight-lined manner in the guide path, the drive wheel being a toothed drive wheel with teeth having a constant cross section parallel to the axis of rotation of the winding shaft of the seat belt retractor, and the engagement points being located between the teeth wherein the engagement part engages the engagement point in an interlocking slip-free manner across the width of engagement part and the width of the tooth being engaged and wherein the drive bodies have projecting guide elements positioned on opposite sides of the drive body, which during the drive movement engage complementary guide recesses integral to each side of the guide path in an interlocking manner, the cross sectional shape of the drive body lying transverse to the drive movement being adapted to the inner contour of the guide path in a manner to support the drive body along the projecting guide elements engaged in the complementary guide recesses.

2. The rotary drive device for a winding shaft of a seat belt retractor according to claim 1, wherein the drive bodies each have at least one projection in the shape of a tooth that is the engagement part.

3. The rotary drive device for a winding shaft of a seat belt retractor according to claim 2, wherein the engagement part engages the engagement point in an interlocking manner.

4. The rotary drive device for a winding shaft of a seat belt retractor according to claim 2, wherein on the drive bodies have guide elements, which during the drive movement engage complementary guide elements in the guide path.

5. The rotary drive device for a winding shaft of a seat belt retractor according to claim 2, wherein the drive bodies lie loosely next to each other on contact surfaces.

6. The rotary drive device for a winding shaft of a seat belt retractor according to claim 2 further comprising a synchronization device that moves a surface limiting the engagement points on the drive wheel into a path of the engagement part of the first drive body to engage the drive wheel.

7. The rotary drive device for a winding shaft of a seat belt retractor according to claim 2, wherein after the drive movement the drive bodies, by a rotation of the drive wheel, can be moved in the guide path opposite to the direction of the drive movement.

8. The rotary drive device for a winding shaft of a seat belt retractor according to claim 1 further comprising a synchronization device that moves a surface limiting the engagement points on the drive wheel into a path of the engagement part of the first drive body to engage the drive wheel.

9. The rotary drive device for a winding shaft of a seat belt retractor according to claim 1, wherein after the drive movement the drive bodies, by a rotation of the drive wheel, can be moved in the guide path opposite to the direction of the drive movement.

* * * * *